United States Patent [19]

Smith et al.

[11] 4,120,241

[45] Oct. 17, 1978

[54] FEEDER PENETRATION ADJUSTMENT MECHANISM

[75] Inventors: Charles A. Smith, New Holland; John H. Merritt, Ephrata, both of Pa.

[73] Assignee: Sperry Rand Corporation, New Holland, Pa.

[21] Appl. No.: 825,873

[22] Filed: Aug. 19, 1977

[51] Int. Cl.² .............................................. B30B 5/00
[52] U.S. Cl. ................................. 100/142; 100/189; 56/341
[58] Field of Search .................. 100/188, 189, 142; 56/341, 342, 343; 198/740, 743, 747

[56] References Cited

U.S. PATENT DOCUMENTS

| | | | |
|---|---|---|---|
| 2,926,601 | 3/1960 | Tarbox et al. | 100/142 |
| 3,112,091 | 2/1964 | McDuffie et al. | 100/189 |
| 3,114,310 | 12/1963 | Holliday | 100/142 |
| 3,115,088 | 12/1963 | McDuffie | 100/142 |
| 3,115,823 | 12/1963 | Nolt et al. | 100/142 |
| 3,127,830 | 4/1964 | McDuffie | 100/142 |

*Primary Examiner*—Peter Feldman
*Attorney, Agent, or Firm*—John B. Mitchell; Frank A. Seemar; Ralph D'Alessandro

[57] ABSTRACT

An adjustable mechanism is disclosed for controlling the amount of feeder penetration into the bale chamber of a hay baler. A three-element linkage interconnecting the baler plunger and the feeder mechanism causes the feeder to reciprocate along a predetermined path toward and away from the bale chamber in timed relationship to the plunger movement. One of the linkage elements is selectively adjustable in length to control travel of the feeder mechanism, and thus the amount of penetration.

9 Claims, 3 Drawing Figures

FEEDER PENETRATION ADJUSTMENT MECHANISM

BACKGROUND OF THE INVENTION

This invention relates generally to crop balers, and specifically to apparatus for controlling the amount of feeder penetration into the bale chamber.

A crop baler is a very complex and important piece of equipment which has become almost an absolute necessity in the economic operation of a modern farm. The complexity of the machine can be appreciated when one observes a skilled operator making the various minor and major adjustments to modify the operational characteristics to suit varying crop conditions. The invention set forth herein is directed to hardware for simplifying one of the mentioned adjustments which must from time to time be made by an operator.

Balers of the type under consideration have a mechanical linkage between the plunger and the feeder mechanism which both transfers power from the plunger to the feeder and maintains a specific desired relative movement between the two. The plunger is powered, through a gearbox and crank, by, usually, the power takeoff of a tractor and moves with a reciprocal motion within the bale case. For purposes of description, it should be understood that a portion of the bale case will be referred to as the "bale chamber." The bale chamber is that section of the bale case wherein the plunger cyclically encounters crop materials to compact them into a bale. The bale chamber has at least a side opening with which the feeder mechanism is aligned. The feeder mechanism, including a multiplicity of depending feeder fingers, moves reciprocably across a feed platform to transport crops deposited thereon into the bale chamber. Most usually, the feeder mechanism includes a carriage which is supported for reciprocable movement along the specified path by a pair of rails which maintain the depending feeder fingers at the desired attitude.

As should be readily understood by one skilled in the art, various crop conditions such as size, moisture content, density etc. affect the formation of bales insofar as they affect even deposition in the bale chamber prior to compaction by the plunger. The relationships between the plunger and feeder mechanism is such tht the feeder mechanism moves the crop material into the bale chamber and moves away therefrom as the plunger moves into the bale chamber on its power stroke. The improved adjustment under consideration here is the amount of penetration of the feeder mechanism, or feeder fingers, into the bale chamber. As pointed out, some drop conditions require deeper penetration than others and, in order to produce well-formed bales, the operator must be able to control this penetration while maintaining acceptable timing relationship between the plunger and the feeder mechanism.

As exemplified by U.S. Pat. No. 3,122,091, prior art balers may be adjusted at the pivot connection between the control linkage and the plunger. While this arrangement has proven to be effective, it has been found to have disadvantages which may make it less desirable than that disclosed herein. Adjustment of the mechanism shown in the above-noted patent requires the use of a multiplicity of wrenches—items which may not be readily available in the field. Also, the adjustable pivot connection on the plunger is not readily accessible within the bale case, and thus is not easily regulated.

Another arrangement used heretofore to adjust penetration is disclosed in U.S. Pat. No. 3,115,823. To vary the amount of finger projection into the bale chamber, the feeder carriage is constructed to be extendable and retractable. The problem with this structure is that when the carriage is extended to increase the penetration of the feeder fingers into the bale chamber, the length of the carriage stroke over the platform is correspondingly decreased whereby somewhat less material is picked up on each working stroke of the feeder.

SUMMARY OF THE INVENTION

It is an object of this invention to provide, in a baler of the character described, adjustability in the feeder drive means whereby the amount of projection of the feeder mechanism into the bale chamber may be substantially varied but at the same time not materially changing the overall length of a feeding stroke of the feeder carriage over the infeed platform.

Another object of the instant invention is to provide an adjustable drive structure whereby desirable infeed characteristics are obtained without corresponding detrimental infeed features.

Another object of the instant invention is to provide a feeder mechanism in which the length of each feeding stroke remains substantially constant regardless of adjustments made to vary the projection of the feeder fingers into the bale chamber.

A further object of the instant invention is to provide feeder drive adjustment means which is simple of construction, inexpensive of manufacture, and extremely effective in use.

A still further object of the instant invention is to provide an improved drive for a feeder mechanism incorporating adjustment means which positively lock the operative components in a selected adjustment position.

These and other objects are obtained according to the instant invention by providing an adjustable mechanism for controlling the amount of feeder penetration into the bale chamber of a hay baler. A three-element linkage interconnecting the baler plunger and feeder mechanism causes the feeder to reciprocate along a predetermined path toward and away from the bale chamber in timed relationship to the plunger movement. One of the linkage elements is selectively adjustable in length to control travel of the feeder mechanism, and thus the amount of penetration.

BRIEF DESCRIPTION OF THE DRAWINGS

For a better understanding of the invention as well as other objects and further features thereof, reference is made to the following detailed disclosure of the preferred embodiment of the invention taken in conjunction with the accompanying drawings thereof wherein.

DESCRIPTION OF THE PREFERRED EMBODIMENT

Figure 1:
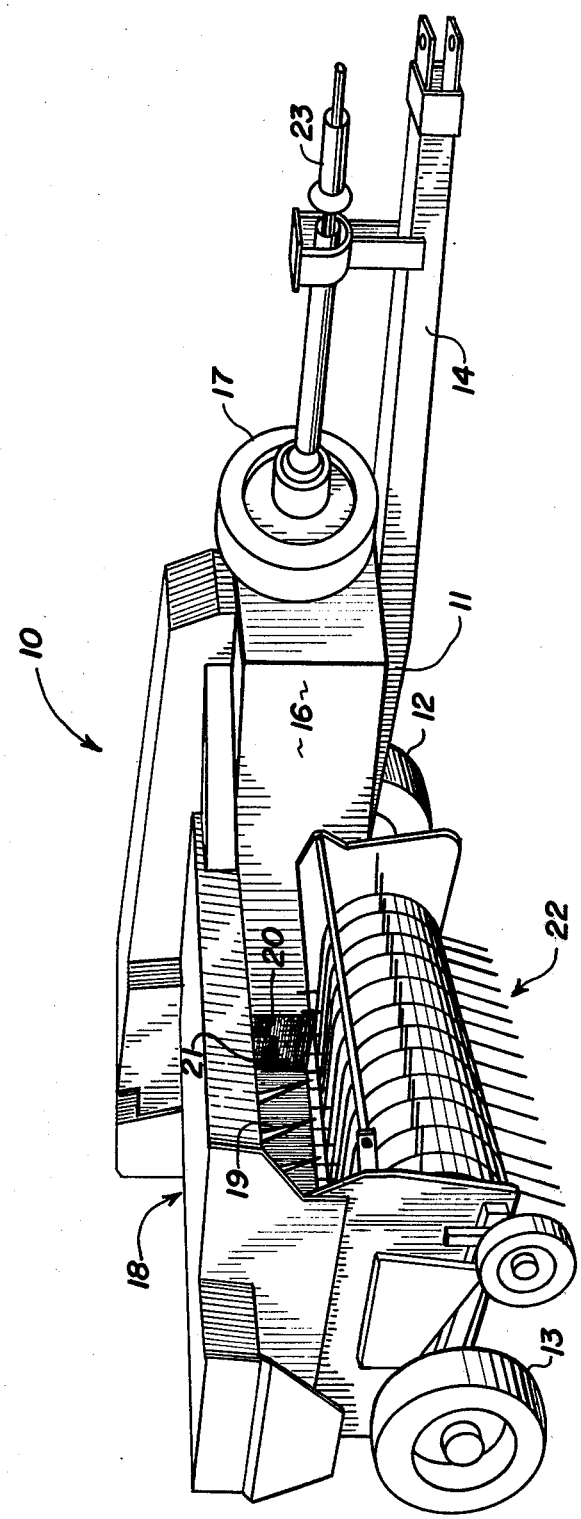
FIG. 1 is a front perspective view of a crop baler with which the instant invention may be used.

Referring now to the drawings, and particularly to FIG. 1, there is shown a crop baler, generally indicated by the numeral 10. The baler 10 includes a frame 11 supported and made mobile by right and left ground-engaging wheels 12 and 13 rotatably mounted on right and left spindles being connected and extending outwardly from respective opposite sides of frame 11. The baler has a tongue 14 pivotally connected to the frame 11 and extending forwardly of the baler. When connected to the drawbar of the tractor (not shown), the baler 10 may be towed across a field.

The baler 10 further includes a fore-and-aft extending bale case 16 on the frame 11 having a forward end on which a flywheel 17 is rotatably mounted, a infeed housing 18 transversely mounted on the frame 11 adjacent the right side of the bale case 16 within which is mounted a feeder mechanism (only the feeder fingers 19 of which can be seen in this figure) adapted to convey crop material into the bale chamber 20 of bale case 16 through an inlet opening 21, and a pickup assembly 22 mounted on the frame 11 forwardly of and below the infeed housing 18 and adapted to lift crop material from the field and deliver it to the feeder mechanism.

A plunger, to be described further below, is mounted for reciprocable movement in the bale chamber 20 for forming the crop material conveyed therein, through inlet opening 21, into rectangular bales. As the bales are formed in the bale chamber 21, they move progressively towards the rear end of the bale case 16. After each bale is completed, it is banded with a suitable tying medium and, subsequently, emerges from the rear or discharge end of the bale case.

The power necessary for operation of the various baler mechanisms is transmitted from the tractor to the flywheel 17 via power takeoff 23. The rotary power transmitted to the flywheel is transferred therefrom to the various other components through means partially described below.

Figure 2:
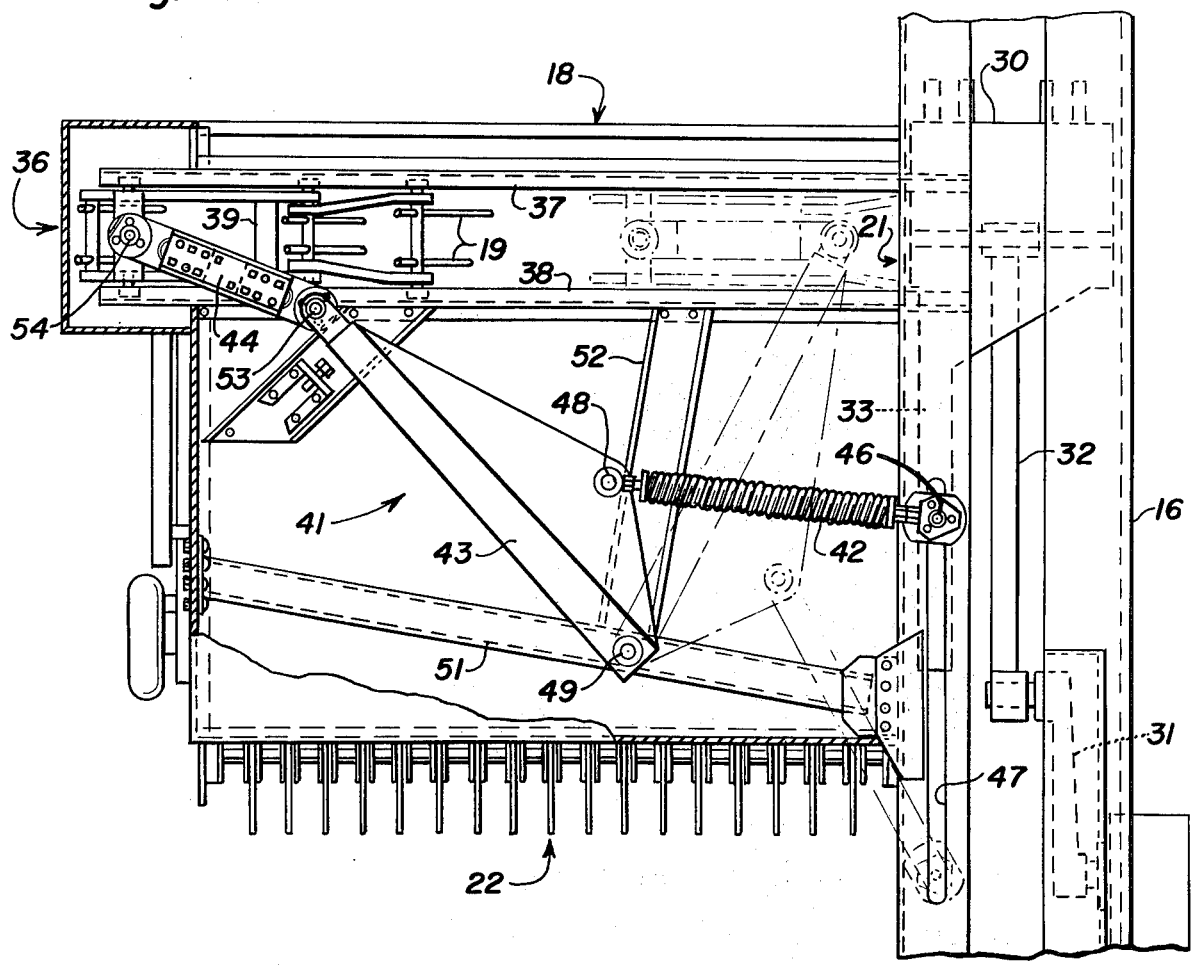
FIG. 2 is a partial top plan view, in partial cross section, of the baler of FIG. 1 showing the inventive arrangement.

Attention is now directed to FIG. 2 wherein the primary elemental relationship between the various operative components of the invention can be seen in more detail. The infeed housing 18 is shown to be substantially perpendicular to the bale case 16 and in communication therewith through opening 21. As stated in the Background of the Invention above, for purposes of description that portion of the bale case 16 where materials are compacted will be referred to as the "bale chamber", and referenced by the numeral 20.

A plunger 30 is attached to rotating crank 31 via arm 32 and is thereby moved reciprocably within bale case 16. Plunger 30 includes an elongate forward portion 33, one function which will be described below.

A feeder mechanism, generally shown as 36, comprises a pair of fixed opposing guide rails 37-38 which extend substantially the entire length of infeed housing 18 and terminate above the bale chamber, a frame 39 slidably mounted in rails 37-38, and a multiplicity of depending feeder fingers 19. Frame 39 moves reciprocably toward and away from bale chamber 20 such that the feeder fingers 19 transport crop materials into the chamber.

The most desirable and efficient positional relationship between plunger 30 and feeder mechanism 36 is one in which they reach the bale chamber 20 at opposite ends of their respective cycles. More specifically, it is desirable to have the plunger compressing crops in the bale chamber while the feeder mechanism is approaching its outboard position (solid lines in FIG. 2), and to have the plunger approaching its full retracted position while the feeder mechanism is depositing crops in the bale chamber (dotted lines in FIG. 2). In order to ensure this relationship, a linkage system 41 is provided between the plunger 30 and feeder mechanism 36. In addition to promoting the proper relationship, the linkage system transfers motive power from the drive plunger to the feeder mechanism.

Linkage 41 comprises generally three pivotally interconnected elements, i.e., arms 42, 43 and 44. Arm 42 is a telescoping member known in the art which is capable of absorbing shocks encountered by the system due to obstruction impact or element over or under-travel. One end of arm 41 is pivotally connected at 46 to the elongate portion 33 of plunger 30 through a slot 47 in bale case 16. The connection between arm 42 and portion 33 is fixed insofar as it is not adjustable relative to the length of the portion. The other end of arm 42 is pivotally connected at 48 to arm 43 at a location intermediate its two ends. Arm 43 is held in pivotally fixed position at 49 by support brackets 51 and 52. The other end of arm 43 is pivotally connected to one end of arm 44 at 53. At its opposite end, arm 44 is pivotally fixed at 54 to carriage 39 of feeder mechanism 36. As can be seen in FIG. 2 comparison of the solid and dotted line positions, movement of the plunger 30 causes, through linkage 41, a corresponding movement of the feeder mechanism 36.

Figure 3:
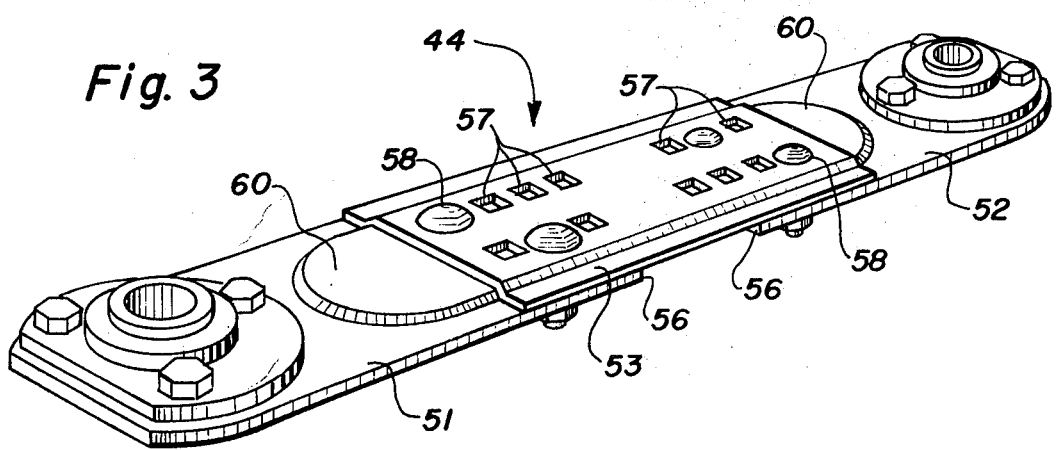
FIG. 3 is a perspective view of the adjustment mechanism of the instant invention.

The adjustment characteristics described herein are provided for in linkage 41 by arm 44. Referring to FIG. 3, it can be seen that arm 44 is comprised of end plates 51 and 52 and an extension plate 53. Each end plate includes, as shown, a bearing which forms part of the pivotal connections with carriage 39 and arm 43. The end plates 51 and 52 are of such a length that they are considerably shorter in total than the minimum separation between points 53 and 54, thus forming a gap 56 therebetween. Additionally, each of the end plates includes a plurality of holes therethrough spaced from the respective bearings. Extension plate 53 is of sufficient length to span gap 36 and partially cover each end plate. A plurality of holes 57 are formed through plate 53 in a pattern which may be easily aligned with the holes through the end plates. By alignment of selected holes in extension plate 53 with the holes in the end plates, the overall length of arm 44 may be readily adjusted. Bolts 58 extend through the respective plates to hold arm 44 together as a unitary structure. Any suitable bolt and hole design may be employed; however, substantially square holes with carriage bolts have been found particularly advantageous because of the resultant need for only one wrench to make the adjustment.

The overall arrangement set forth above provides a readily accessible and highly reliable control linkage between the plunger and the feed mechanism which may be easily adjusted in the field to compensate for changing crop conditions.

It will be understood that various changes in the details and arrangements of parts, which have herein been described and illustrated in order to explain the nature of the invention, will occur to and may be made by those skilled in the art upon a reading of the disclosure within the principles and scope of the invention.

For example, one of skill in the art will readily realize that arm 44 will be subjected to repeated and strong forces. Therefore, to promote an acceptable strength/weight ratio of the element, it would be advantageous to form the various components with strength enhancing cross sectional configurations. See, for example, the relief patterns 60 shown in FIG. 3.

Having thus described the invention, what is claimed is:

1. In a hay baler having an elongated bale chamber provided with a feeding opening in a side wall thereof, a feeder reciprocal toward and away from said side wall, a plunger reciprocable in said bale chamber to compress hay deposited therein into bales, and an adjustable linkage between said plunger and said feeder causing said feeder to move toward and away from said feed opening in timed relation to said plunger the improvement in said linkage comprising:
   a first elongate member having a first end and a second end, said first end of said first member pivotally fixed to said plunger;
   a second elongate member having a first end and a second end, said first end of said second member pivotally fixed at a point spaced from said plunger and said feeder;
   a third elongate member having a first end and a second end, said first end of said third member pivotally connected to said second end of said second member and said second end of said third member pivotally fixed to said feeder, said third member being selectively adjustable in length;
   said second end of said first member pivotally connected to said second member intermediate the two ends thereof whereby reciprocal movement of said plunger causes corresponding movement of said feeder.

2. The baler of claim 1, wherein all said pivot connections are substantially in the same horizontal plane.

3. The baler of claim 2 wherein said third member further comprises:
   first and second plates spaced apart and pivotally connected, respectively, to said feeder and said second end of said second member;
   a third plate at least partially overlapping said first and second plates and spanning the space therebetween; and
   connector means selectively adjustably fixing said first, second and third plates together.

4. The baler of claim 3 wherein said connector means includes:
   an arrangement of orifices through each of said first and second plates;
   an arrangement of orifices through said third plate aligned with said orifices on said first and second plates; and
   a multiplicity of threaded bolts extending through selected aligned orifices in said plates to rigidly fix said plates together.

5. A hay baler having a fore-and-aft extending bale chamber provided with a feed opening in a side wall thereof, a driven plunger reciprocable in said bale chamber to compress hay deposited therein into bales, an infeed housing substantially perpendicular to and in alignment with said feed opening, a feed mechanism mounted within said infeed housing for reciprocable movement therein toward and away from said feed opening, a drive linkage connected between said plunger and said feed mechanism including
   a main pivot arm having a first end and a second end, said first end of said main pivot arm pivotally fixed at a point spaced from said feed mechanism and said plunger;
   a spring-biased telescoping arm having a first end pivotally connected to said plunger and a second end pivotally connected to said main pivot arm at a location spaced from said first end of said main pivot arm;
   an adjustable length arm having a first end pivotally connected to said second end of said main pivot arm and a second end pivotally connected to said feed mechanism, whereby adjustment of said adjustable length arm controls the relative movement between said plunger and said feed mechanism.

6. The baler of claim 5 wherein said main pivot arm, telescoping arm and adjustable length arm are substantially in the same horizontal plane.

7. The baler of claim 6 wherein said adjustable length arm further comprises:
   first and second plates spaced apart and pivotally connected, respectively, to said feeder mechanism and said second end of said main pivot arm;
   a third plate at least partially overlapping said first and second plates and spanning the space therebetween; and
   connector means selectively adjustably fixing said first, second and third plates together.

8. The baler of claim 7 wherein said connector means includes:
   an arrangement of orifices through each of said first and second plates;
   an arrangement of orifices through said third plate aligned with said orifices on said first and second plates; and
   a multiplicity of threaded bolts extending through selected aligned orifices in said plates to rigidly fix said plates together.

9. The baler of claim 8 wherein
   said feed mechanism is supported for movement at least partially into and out of said bale chamber through said feed opening.

* * * * *